United States Patent
Peterson et al.

(10) Patent No.: US 7,152,478 B2
(45) Date of Patent: Dec. 26, 2006

(54) SENSOR USABLE IN ULTRA PURE AND HIGHLY CORROSIVE ENVIRONMENTS

(75) Inventors: Thomas Peterson, Chanhassen, MN (US); Jorge Andres Diaz Diaz, Minneapolis, MN (US); Gerald R. Cucci, Minneapolis, MN (US)

(73) Assignee: Entegris, Inc., Chaska, MN (US)

( * ) Notice: Subject to any disclaimer, the term of this patent is extended or adjusted under 35 U.S.C. 154(b) by 504 days.

(21) Appl. No.: 10/440,433

(22) Filed: May 16, 2003

(65) Prior Publication Data

US 2004/0040382 A1 Mar. 4, 2004

Related U.S. Application Data

(63) Continuation-in-part of application No. 09/620,007, filed on Jul. 20, 2000, now Pat. No. 6,612,175.

(51) Int. Cl.
*G01L 7/08* (2006.01)
(52) U.S. Cl. ........................................ 73/715
(58) Field of Classification Search .............. 73/700, 73/702, 708, 714, 715, 716, 729.1, 729.2, 73/756
See application file for complete search history.

(56) References Cited

U.S. PATENT DOCUMENTS

| | | |
|---|---|---|
| 3,916,365 A | 10/1975 | Giachino |
| 3,930,823 A | 1/1976 | Kurtz et al. |
| 3,946,615 A | 3/1976 | Hluchan |
| 4,016,644 A | 4/1977 | Kurtz |
| 4,065,970 A | 1/1978 | Wilner |
| 4,127,840 A | 11/1978 | House |
| 4,151,578 A | 4/1979 | Bell |
| 4,161,887 A | 7/1979 | Stone et al. |
| 4,177,496 A | 12/1979 | Bell et al. |
| 4,202,217 A | 5/1980 | Kurtz et al. |
| 4,203,327 A | 5/1980 | Singh |
| 4,207,604 A | 6/1980 | Bell |
| 4,227,419 A | 10/1980 | Park |
| 4,236,137 A | 11/1980 | Kurtz et al. |
| 4,291,293 A | 9/1981 | Yamada et al. |
| 4,329,732 A | 5/1982 | Kavli et al. |

(Continued)

FOREIGN PATENT DOCUMENTS

EP 0723143 A1 7/1996

(Continued)

OTHER PUBLICATIONS

European Search Report dated Jul. 30, 2003.

*Primary Examiner*—Eric S. McCall
(74) *Attorney, Agent, or Firm*—Patterson, Thuente, Skaar & Christensen, P.A.

(57) ABSTRACT

The electrical pin lead structure and brazing technique of the present invention provide a brazed lead in a sensor that adheres well to a semiconductor substrate while facilitating lateral flexibility without joint fatigue or breakage. In one example embodiment, the pin lead includes a coil head that is brazed to a silicon layer on a sapphire substrate using a silver-copper-palladium braze material. An advantage to this approach is the ability to both braze the pin lead to the diaphragm and seal the diaphragm to the ceramic backing plate with a high temperature glass in a single process step. Further, the palladium in the braze composition is a factor in reducing surface tension between the metal lead and semiconductor substrate during cooling to avoid stress fractures in the substrate.

18 Claims, 8 Drawing Sheets

U.S. PATENT DOCUMENTS

| | | |
|---|---|---|
| 4,345,476 A | 8/1982 | Singh |
| 4,347,745 A | 9/1982 | Singh |
| 4,373,399 A | 2/1983 | Beloglazov et al. |
| 4,395,915 A | 8/1983 | Singh |
| 4,398,426 A | 8/1983 | Park et al. |
| 4,425,799 A | 1/1984 | Park |
| 4,426,673 A | 1/1984 | Bell et al. |
| 4,439,752 A | 3/1984 | Starr |
| 4,501,051 A | 2/1985 | Bell et al. |
| 4,535,283 A | 8/1985 | Rabinovich et al. |
| 4,574,640 A | 3/1986 | Krechmery |
| 4,586,109 A | 4/1986 | Peters et al. |
| 4,600,912 A | 7/1986 | Marks et al. |
| 4,656,454 A | 4/1987 | Rosenberger |
| 4,665,754 A | 5/1987 | Glenn et al. |
| 4,725,406 A | 2/1988 | Compton et al. |
| 4,735,917 A | 4/1988 | Flatley et al. |
| 4,751,554 A | 6/1988 | Schnable et al. |
| 4,765,188 A | 8/1988 | Krechmery et al. |
| 4,773,269 A | 9/1988 | Knecht et al. |
| 4,774,843 A | 10/1988 | Ghiselin et al. |
| 4,864,463 A | 9/1989 | Shkedi et al. |
| 4,876,892 A | 10/1989 | Arabia et al. |
| 4,903,000 A | 2/1990 | Yajima et al. |
| 4,987,782 A | 1/1991 | Shkedi et al. |
| 4,994,781 A | 2/1991 | Sahagen |
| 4,999,735 A | 3/1991 | Wilner |
| 5,005,421 A | 4/1991 | Hegner et al. |
| 5,024,097 A | 6/1991 | Graeger et al. |
| 5,050,034 A | 9/1991 | Hegner et al. |
| 5,050,035 A | 9/1991 | Hegner et al. |
| 5,076,147 A | 12/1991 | Hegner et al. |
| 5,079,953 A | 1/1992 | Martin et al. |
| 5,088,329 A | 2/1992 | Sahagen |
| 5,097,712 A | 3/1992 | Gerst et al. |
| 5,111,698 A | 5/1992 | Banholzer et al. |
| 5,155,061 A | 10/1992 | O'Conner et al. |
| 5,174,926 A | 12/1992 | Sahagen |
| 5,233,875 A | 8/1993 | Obermeier et al. |
| 5,303,594 A | 4/1994 | Kurtz et al. |
| 5,315,877 A | 5/1994 | Park et al. |
| 5,334,344 A | 8/1994 | Hegner et al. |
| 5,349,492 A | 9/1994 | Kimura et al. |
| 5,441,591 A | 8/1995 | Imthurn et al. |
| 5,731,522 A | 3/1998 | Sittler |
| 5,750,899 A | 5/1998 | Hegner et al. |
| 5,772,322 A | 6/1998 | Burns et al. |
| 5,808,205 A | 9/1998 | Romo |
| 5,954,900 A | 9/1999 | Hegner et al. |
| 5,955,678 A | 9/1999 | Chapman et al. |
| 6,012,336 A | 1/2000 | Eaton et al. |
| 6,031,944 A | 2/2000 | Youngner |
| 6,612,175 B1 | 9/2003 | Peterson et al. |

FOREIGN PATENT DOCUMENTS

| | | | |
|---|---|---|---|
| EP | 0990885 A2 | 4/2000 | |

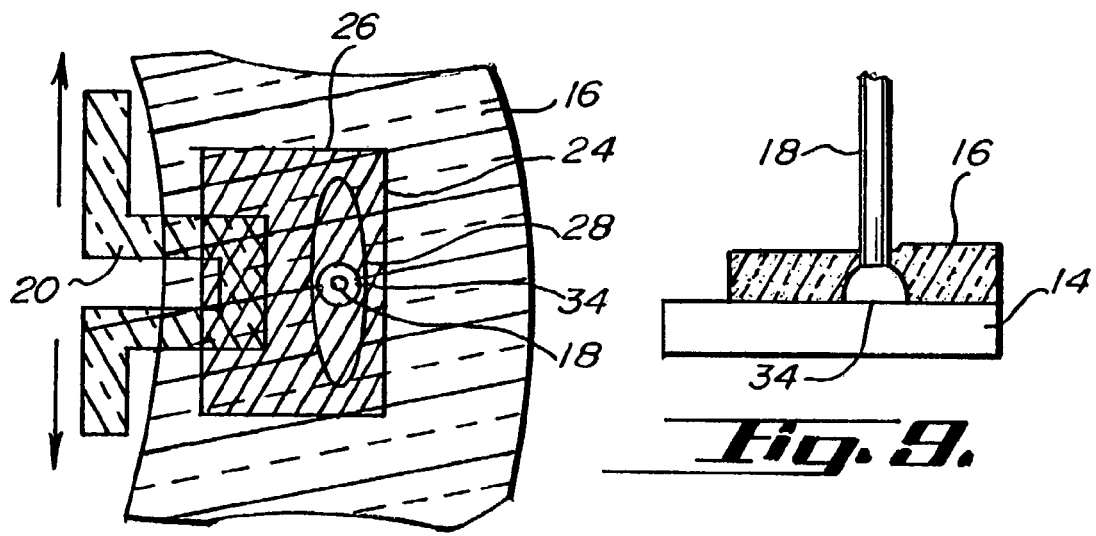
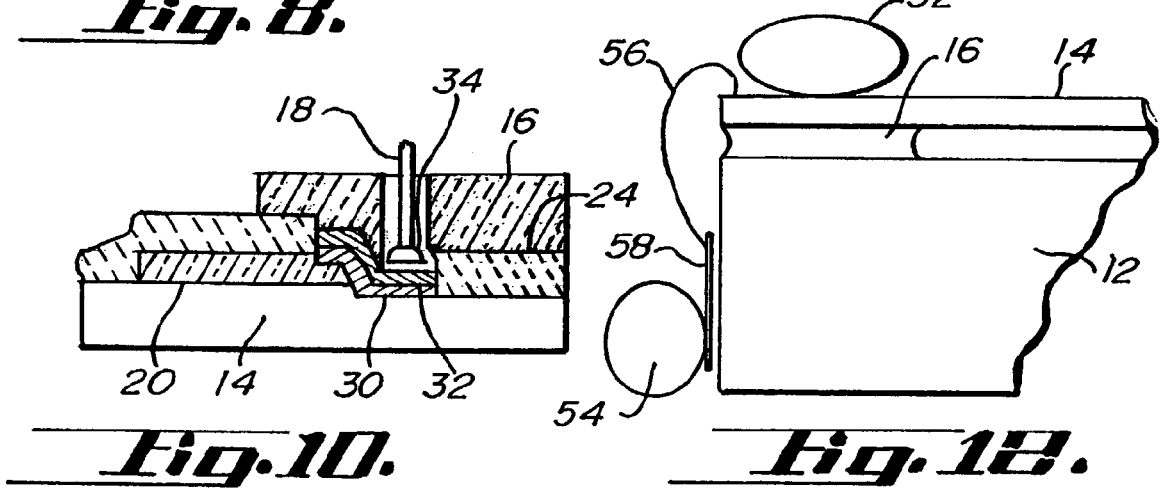
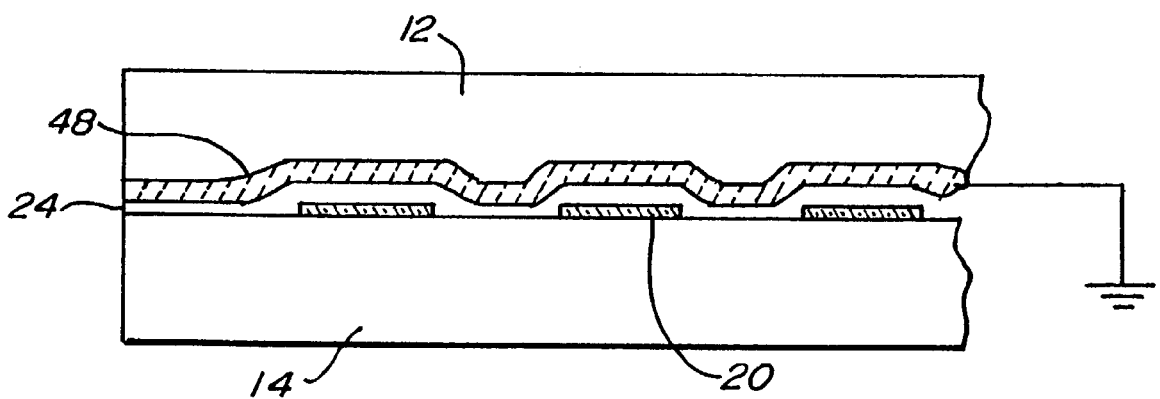

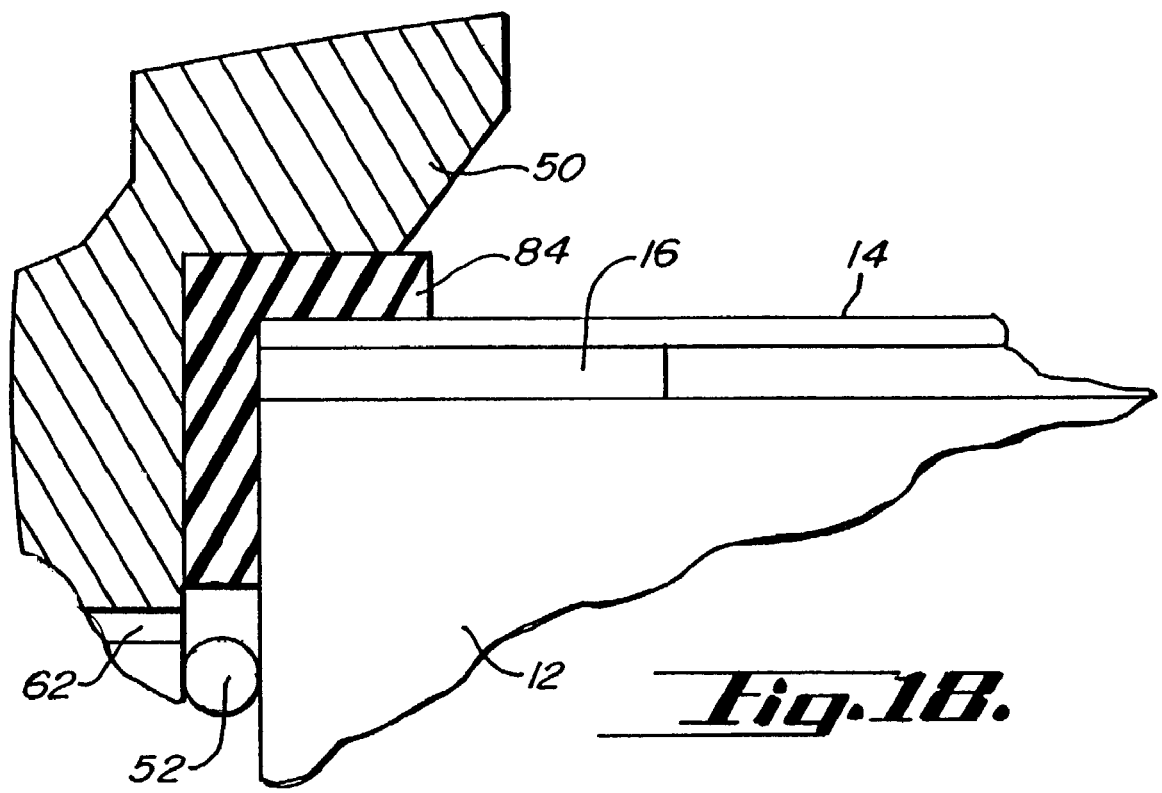

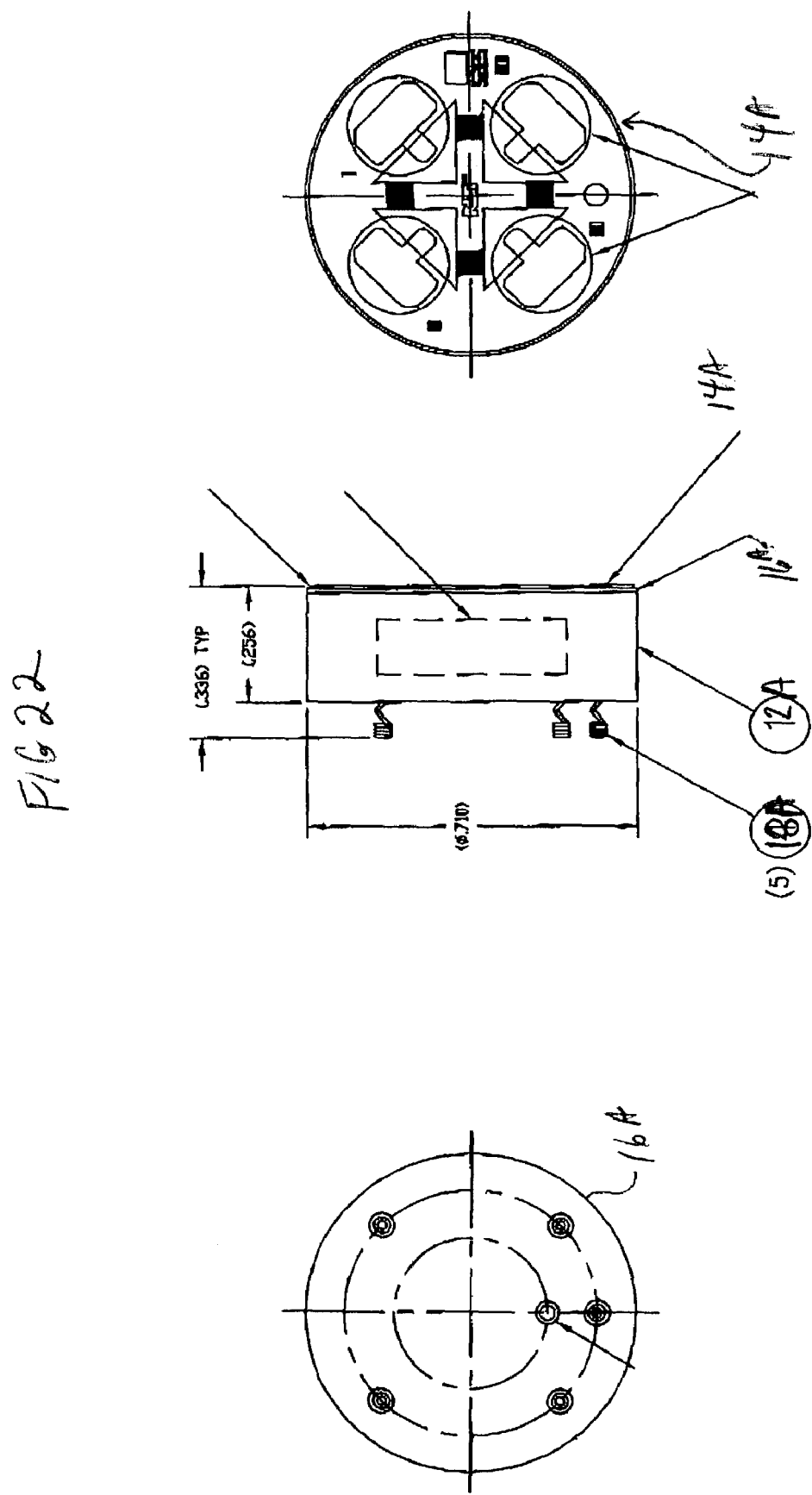

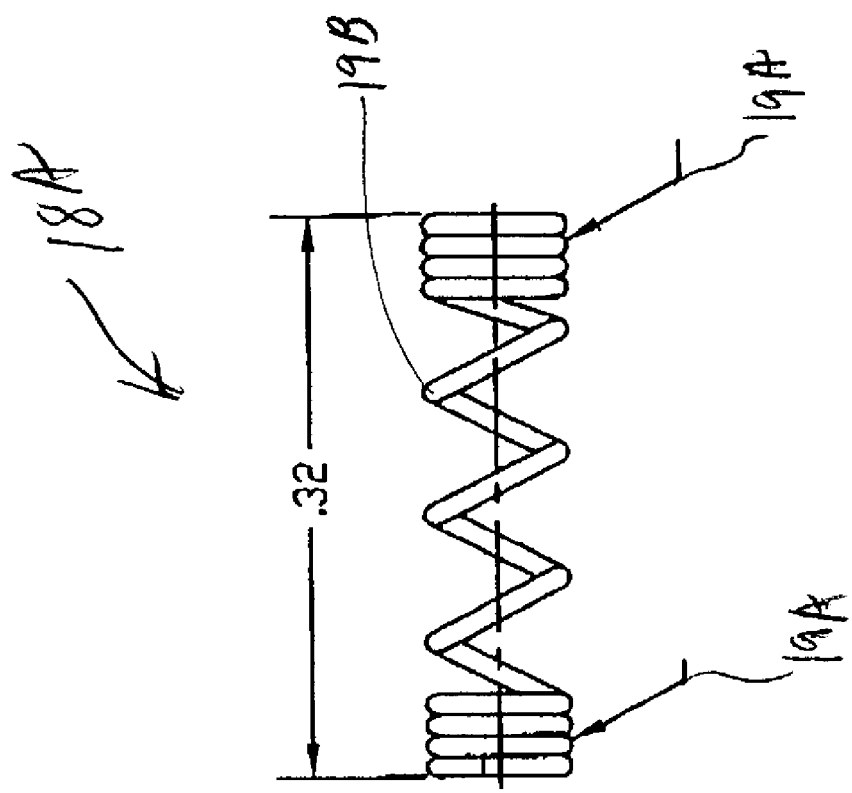

SENSOR USABLE IN ULTRA PURE AND HIGHLY CORROSIVE ENVIRONMENTS

RELATED APPLICATIONS

The present application is a continuation-in-part of the application entitled Sensor Usable in Ultra Pure and Highly Corrosive Environments filed on Jul. 20, 2000, with application Ser. No. 09/620,007 now U.S. Pat. No. 6,612,175.

FIELD OF THE INVENTION

The present invention relates generally to sensors and more particularly to a pressure and/or temperature sensor having high temperature stability and resistant to chemical attack.

BACKGROUND OF THE INVENTION

Pressure sensors have been utilized in various applications to measure either gauge pressure or absolute pressure. Many of these applications involve the measurement of pressure in unfavorable environments. The pressure sensor may be of a capacitive type or piezoresistive type. For example, an alumina ceramic capacitive sensor may comprise a thin, generally compliant ceramic sheet having an insulating spacer ring sandwiched between a thicker, non-compliant ceramic sheet. The first thin sheet or diaphragm is approximately 0.005 to 0.050 inches in thickness with a typical thickness of 0.020 inches. The thicker ceramic sheet has a thickness range between 0.100 to 0.200 inches. Those skilled in the art will appreciate that the thickness of the diaphragm is preferably dependent upon the diameter of the diaphragm. The spacer may be constructed of a suitable glass material. The apposed faces of ceramic disks are metallized by metals such as gold, nickel or chrome to create plates of a capacitor. A similar capacitive pressure transducer is described by Bell et al. in U.S. Pat. No. 4,177,496 (the '496 patent). Other capacitive pressure transducers similar to that described in the '496 patent are available and known in the art. A piezoresistive sensor typically utilizes a Wheatstone bridge, measuring changes in voltage and correlating the voltage changes to changes in sensed pressure. Either of these pressure sensor types may be utilized to measure the pressure of fluids in ultra-pure environments, however, there is a need for a non-contaminating pressure sensor.

Ultra pure processing of sensitive materials typically requires the use of caustic fluids. The susceptibility to contamination of the sensitive materials during the manufacturing process is a significant problem faced by manufacturers. Various manufacturing systems have been designed to reduce the contamination of the sensitive materials by foreign particles, ionic contaminants, and vapors generated during the manufacturing process. The processing of the sensitive materials often involves direct contact with caustic fluids. Hence, it is critical to deliver the caustic fluids to the processing site in an uncontaminated state and without foreign particulate. Various components of the processing equipment are commonly designed to reduce the amount of particular generated and ions dissolved into the process fluids, and to isolate the processing chemicals from contaminating influences.

The processing equipment typically includes liquid transporting systems that carry the caustic chemicals from supply tanks through pumping and regulating stations and through the processing equipment itself. The liquid chemical transport systems, which includes pipes, pumps, tubing, monitoring devices, sensing devices, valves, fittings and related devices, are frequently made of plastics resistant to the deteriorating effects of the caustic chemicals. Metals, which are conventionally used in such monitoring devices, cannot reliably stand up to the corrosive environment and will contaminate the process fluid for long periods of time. Hence, the monitoring and sensing devices must incorporate substitute materials or remain isolated from the caustic fluids.

While the processes must be very clean they often involve chemicals that are very aggressive. These could include for example harsh acids, bases, and solvents. The semiconductor industry has recently introduced processes, which make use of aggressive abrasives. Both the process equipment and the monitoring instrumentation must be impervious to the mechanical action of these abrasives.

Further, high reliability of process equipment instrumentation is a must. Shutting down a semiconductor or pharmaceutical line for any reason is costly. In the past, pressure transducers have commonly employed fill fluids separated by a thick isolating diaphragm to transmit pressure from the process to the sensor itself. The fill fluids are separated from the process by an isolator diaphragm of one sort or another. Failure of this isolator diaphragm and subsequent loss of fill fluid into the process can cause loss of product and require system cleaning before restarting operations. The isolating diaphragm will introduce significant and in some cases unacceptable pressure measurement errors. Eliminating the isolator diaphragm and fill fluid from the design is advantageous.

Also, the processing equipment commonly used in semiconductor manufacturing has one or more monitoring, valving, and sensing devices. These devices are typically connected in a closed loop feedback relationship and are used in monitoring and controlling the equipment. These monitoring and sensing devices must also be designed to eliminate any contamination that might be introduced. The sensing devices may include pressure transducer modules and flow meters having pressure sensors. It may be desirably to have a portion of the pressure sensor of the pressure transducer or flow meter in direct contact with the caustic fluids. Thus, the surfaces of the pressure sensor in direct contact with the caustic fluids should be non-contaminating. It has been found that porous materials allow the ingress and egress of caustic fluids through such materials. For example, ceramic materials are bound together with various glass like materials which themselves are easily attacked by the more aggressive corrosive materials. Hence, it is preferable that those portions of the pressure sensor in direct contact with caustic fluids be made of non-porous materials.

U.S. Pat. No. 4,774,843 issued to Ghiselin et al., describes a strain gauge having a single crystal sapphire diaphragm adhered to an aluminum oxide base. Ghiselin et al., indicates that the sapphire is adhered by means of a glass bonding material, epoxy or other adherent methods. Ghiselin et al., does not provide a further description of the glass bonding material or how the glass bond adheres to the sapphire and aluminum oxide base. However, the Ghiselin patent describes the glass bond as a low strength material that separates at strain points. The Ghiselin patent describes a change in geometry to reduce the strain point and thereby avoid the deficiencies of the low strength of the glass. U.S. Pat. No. 5,954,900 issued to Hegner et al. describes problems with using a glass to bond to an aluminum oxide ceramic part. The Hegner et al. patent describes the use of alumina as the joining material to alumina ceramic. The devices described by Hegner et al., and Ghiselin et al., are believed to be limited to effective operable temperatures below 400° C. Thus, the reliability of the sensors described by Hegner et al., and Ghiselin et al. patents, decreases as temperatures exceed 400° C. Glasses with low melting points have low strength and low mechanical stability. Further these glasses generally have problems in developing uniform bonds. All these characteristics lead to a sensor with lower that optimal repeatability and hysteresis. Hence, there is a need for a pressure sensor having a non-porous surface that is bonded to the base with a high strength bond, wherein the bond between the non-porous material and the base is stable at temperatures in excess of 400° C.

It has also been found that Electromagnetic and Radio Frequency Interference (EMI and RFI respectively) degrade the performance of piezoresistive sensors. A conductive shielding layer cannot be positioned directly between a silicon layer (on which the Wheatstone bridge is formed) and the sapphire because of the epitaxial construction of silicon on sapphire. A conductive shielding layer on the outside of the sapphire is not preferred when the outside of the sapphire is positioned in contact with the caustic fluids. Hence, a need exists for a non-contaminating pressure sensor that blocks the EMI and RFI from affecting the sensing element formed on a non-exposed surface of the pressure sensor.

High temperature processes (600° C. to 1200° C.) are desirable to join single crystal materials such as sapphire or silicon carbide to other single or polycrystalline ceramics via brazing, glassing, and diffusion bonding because they make strong, high yield, stable joints. Where a high temperature process is used the usual methods of making an electrical connection to a semiconductor device on the single crystal or ceramic substrate (typically silicon, but can also include gallium arsenide) can no longer be used. The two most common methods of connection are 1) wire bonding and 2) conductive epoxy joining. With wire bonding a gold or preferably aluminum metal layer must be first deposited on the silicon. At high temperatures gold and aluminum rapidly diffuse into the silicon. Once diffused these material layers no longer form a suitable surface for the wire to bond to.

Metal films that survive a high temperature environment consist of an adhesion layer, such as titanium, which is followed by a diffusion barrier. The diffusion barrier for high temperature processes is a refractory metal such as molybdenum, iridium, niobium, tantalum, tungsten, or osmium. These metals will build up resistive oxides between the conductor and the epoxy over time. For piezoresistive sensors this creates a stability problem. Pre-cleaning the joint prior to applying epoxy slows but does not prevent the formation of the oxide layer. Solder will also not adhere to refractory metals.

One approach for affixing pins or leads to a semiconductor substrate is to braze pins in place as illustrated in FIGS. 19A and 19B, respectively. In particular, FIG. 19A is an example of a prior art brazing of a nail head pin to a substrate while FIG. 19B is an example of a prior art brazing of a headless pin to a substrate. FIG. 19A illustrates a single crystal substrate 200 with a pin 210 that is brazed thereon. Pin 210 includes a pin shaft 212 and a pin head 214 that provides a greater bonding surface area with substrate 200. A braze 216 is applied to the sides of pin head 214. As illustrated via a stress fracture 218, on a thin single crystal material stress fracture becomes a significant problem. As nail head pin 214 is brazed to the flat surface of substrate 200, substrate 200 develops tensile stress as the melted braze hardens (or freezes) and contracts. The tensile stress concentrates at the periphery of pin head 214 and promotes fracturing in the substrate.

One solution to the stress fracturing is to find a metal that matches the thermal expansion rate of the substrate crystalline material. Unfortunately, crystals such as sapphire have different expansion rates in different directions. More seriously metals do not have constant expansion rates over large temperature ranges. They typically expand at a much faster rate at high temperatures than at room temperature. An alloy that matches the temperature coefficient of the crystal at room temperature will have a much higher expansion at 800° C. or 900° C.

As illustrated in FIG. 19B, another approach to minimize stress in substrate 200 is to minimize the cross sectional area of the joint between substrate 200 and a headless pin 210. The headless pin helps to form a very small cross section joint with substrate 200, however the newly formed joint is susceptible to high, localized stress from manipulation of the pin (back and forth—as shown by arrow 220) during subsequent manufacturing steps. A butt joint of this type is considered an unreliable geometry because of the small attachment area and susceptibility to alignment problems.

The present invention meets these and other needs that will become apparent from a review of the description of the present invention.

SUMMARY OF THE INVENTION

The invention relates generally to sensors and more particularly relates to a pressure and/or temperature sensor having exceptional stability up to 200° C. and effectively operable up to 700° C. The pressure sensor of the present invention operates without fluid fill and has no exterior exposed metallic components. The pressure sensor includes a non-porous, impermeable surface that may be positioned in direct contact with fluids in an ultra-pure environment. In one embodiment of the present invention, the non-porous surface is comprised of a layer of single crystal sapphire that is impervious to chemical attack. In this manner, chemicals or contaminants cannot be extracted over time from the sensor into a process stream. Without limitation, the pressure sensor of the present invention is suitable for use in chemically inert pressure transducer module or flow meter for sensing pressures in process fluids and may be molded directly into the high temperature plastic housing of the same.

The present invention provides for a pressure sensor that includes a non-porous outer surface. The non-porous surface is characterized by a low diffusivity and low surface adsorption. In the preferred embodiment, the pressure sensor includes a backing plate, a non-porous diaphragm, a sensing element adjacent an inner surface of the diaphragm, and a glass layer of a high strength material that is bonded by glassing to the backing plate and the non-porous diaphragm. The backing plate provides rigidity to the structure. The rigidity of the backing plate resists stresses transmitted from the housing (not shown) to the sensing elements on the sensor diaphragm. Although the backing plate is not in direct contact with the process medium it is required to be mechanically stable and amenable to high temperature processes. The thermal expansion rate of the backing plate should approximate closely that of the sensing diaphragm. While it is possible to compensate for thermal effects, a large mismatch will produce stresses during manufacture that may cause the bond between the two pieces to yield over time. Those skilled in the art will appreciate that the non-porous diaphragm may include a Wheatstone bridge or a conductive layer formed thereon as part of a piezoresistive or capacitive type sensor respectively.

Without limitation, in the preferred embodiment, a silicon layer is formed on an inner surface of the non-porous diaphragm, wherein a strain gage such as a Wheatstone bridge is formed thereon. The backing plate includes apertures extending therethrough, the apertures being adapted for receiving electrical leads coupled to the sensing element. A change in pressure near the non-porous diaphragm is detectable by the sensing element. An increase and decrease of pressure against the diaphragm causes deflection of the diaphragm, which in turn changes the resistances of the strain gage. The changes in resistance is correlated with the pressure adjacent the diaphragm.

Without limitation, the non-porous diaphragm is preferably comprised of a chemically inert material such as sapphire. The glass layer between the sapphire and the backing plate is preferably made of high bond strength borosilicate glass or other glass of suitable known construction having a high bond strength and melt temperature above 700° C. and preferably above 1000° C. The amount that the diaphragm flexes is controlled by the thickness and diameter of the glass layer. The glass layer may have a thickness ranging between 0.002 and 0.030 inches with 0.010 inches being preferred and an outside diameter ranging from 0.100 to 2.0 inches with 0.700 inches being preferred. The active sensing area of the diaphragm may range from 0.050 to 2.0 inches with 0.400 inches being preferred. Those skilled in the art will appreciate that the range of thickness and diameter of the diaphragm should not be construed as limiting, but that the thickness and diameter in certain applications may be further reduced or increased as desired. In this manner, the non-porous diaphragm engages an inner surface of the backing plate. Those skilled in the art will appreciate that the backing plate and non-porous diaphragm are constructed of materials having similar thermal expansion rates to avoid unnecessary stress through a wide range of temperatures. As described below in greater detail the pressure sensor may be constructed such that the sensing element may detect an absolute pressure or gage pressure.

The pressure sensor may further include a silicon nitride layer and a metallization or conductive layer positioned between the silicon layer and the backing plate (see FIG. 11). In this manner the silicon nitride layer acts as an electrical insulator and the metallization layer blocks EMI/RFI from affecting the sensing element 20. The pressure sensor may further include a coating, gasket or seal adjacent to at least a portion of an outer edge of the layers of the non-porous diaphragm, silicon nitride layer, metallization layer and the backing plate. Without limitation, acid resistant epoxy or corrosion resistant polymers such as PTFE (polytetrafluoroethylene), PVDF (polyvinylidenefluoride), PEEK (polyetheretherketone), urethane, or Paralyne protection may be utilized, wherein an acid resistant epoxy is preferred.

The pressure sensor includes bond pads formed on the diaphragm between the glass layer and the non-porous diaphragm. Without limitation, the preferred embodiment of the bond pads comprise a titanium layer and a diffusion barrier. The doped silicon thin film interconnects the bond pads in a known suitable manner to form the Wheatstone bridge. A window is formed in the glass layer and backing plate, thereby providing access to bond pads. Electrical leads extend through the windows formed in the glass layer and backing plate and the electrical leads are brazed to the bond pads. The electrical leads are brazed to the bond pads and the glass layer is glassed to the diaphragm and backing plate.

In an alternate embodiment the diaphragm and sensing element is modified to create a capacitance rather than a piezoresistive sensor. The thin sensing diaphragm, which flexes when pressure is applied, has a capacitive plate formed on the inner surface of the sensing diaphragm and another capacitive plate is formed on the inner surface of the backing plate. One electrical lead is connected to the capacitive plate formed on the inner surface of the sensing diaphragm and another lead is electrically coupled to the inner surface of the backing plate. As the spacing between the diaphragm and the plate vary with pressure the capacitance of the plate changes. This variation in capacitance is detected by an electrically connected sensing element of know suitable construction.

The advantages of the present invention will become readily apparent to those skilled in the art from a review of the following detailed description of the preferred embodiment especially when considered in conjunction with the claims and accompanying drawings in which like numerals in the several views refer to corresponding parts.

BRIEF DESCRIPTION OF THE DRAWINGS

FIG. 8 is a partial sectional top plan view of an embodiment of the bond pads of the present invention.

FIG. 9 is a partial sectional side elevational view of an embodiment of the bond pads of the present invention.

FIG. 10 is a partial sectional side elevational view of an embodiment of the bond pads of the present invention.

FIG. 11 is a partial sectional side elevational view of an embodiment of the pressure sensor of the present invention.

FIG. 12 is a partial sectional side elevational view of an embodiment of the pressure sensor of the present invention.

FIG. 18 is a partial sectional side elevational view of an embodiment of the pressure sensor of the present invention having a seal or gasket adjacent an edge of the sensor.

FIG. 22 is a side view of the assembled sensor of FIG. 21.

FIG. 23 is an enlarged view of a coil spring lead of the present invention.

DETAILED DESCRIPTION OF THE DRAWINGS

Figure 1:
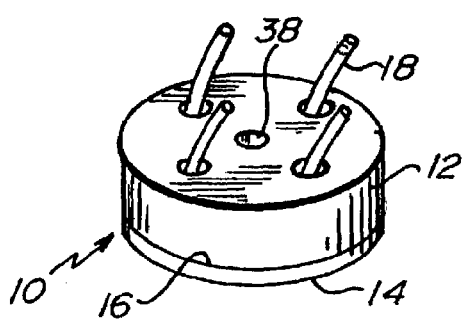
FIG. 1 is a perspective view of the pressure sensor of the present invention.
Figure 2:
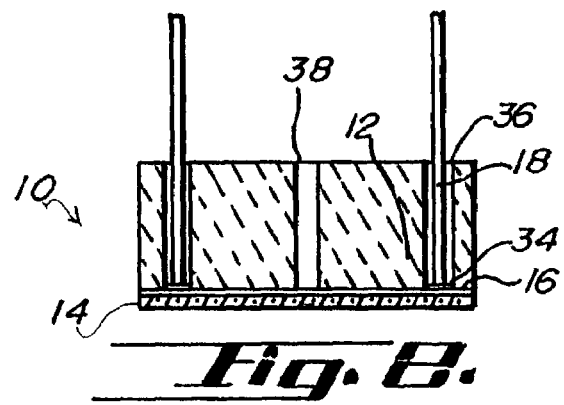
FIG. 2 is a partial sectional side elevational view of an embodiment of the pressure sensor of the present invention.

The present invention represents broadly applicable improvements to pressure sensors. The embodiments detailed herein are intended to be taken as representative or exemplary of those in which the improvements of the invention may be incorporated and are not intended to be limiting. The pressure sensor of the present invention may be constructed as a piezoresistive or capacitive sensor having a sensing diaphragm. The sensing diaphragm is made of a piece of single crystal sapphire. Alternatively, the sensing diaphragm may be constructed of a single crystal diamond. The sensor 10 of the present invention generally comprises a backing plate 12, sensing diaphragm 14, silica glass bond 16 between the backing plate 12 and the diaphragm 14, and electrical leads 18 (see FIGS. 1 and 2). During the manufacture of the sensing diaphragm 14, a large wafer of the single crystal sapphire is used so that many sensors can be fabricated at the same time using the familiar planar processes of the semiconductor technology.

Those skilled in the art will recognize that sapphire is an electrical insulator. When the sapphire is cut along the R-plane it is possible to grow a single crystal epitaxial film of silicon of appropriate thickness on top of the sapphire. The silicon layer can, by diffusion, ion implantation, or other means be doped with atomic species such as boron or phosphorus to give the film semiconducting properties. By varying the implantation energy and dopant concentration the area resistance value of the film can be adjusted. This film, in addition to having electrical resistance, will change its resistance in response to strain. This property is known as piezoresistance. As described earlier, deflection of the sensing diaphragm 14 will strain the film and produce a change in resistance. The pressure-sensing signal is derived from this change in resistance.

Figure 6:
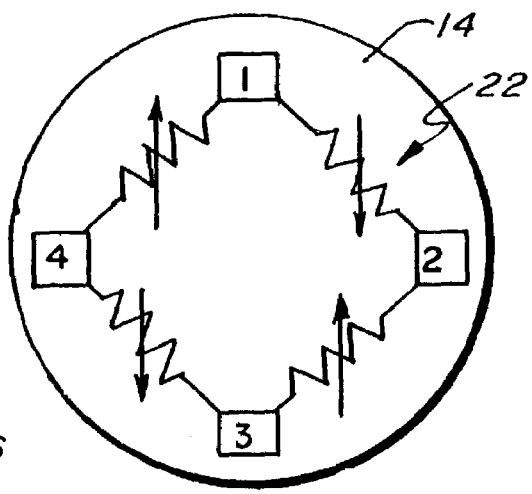
FIG. 6 is a top plan view of the diaphragm having a Wheatstone bridge formed thereon of the present invention.
Figure 7:
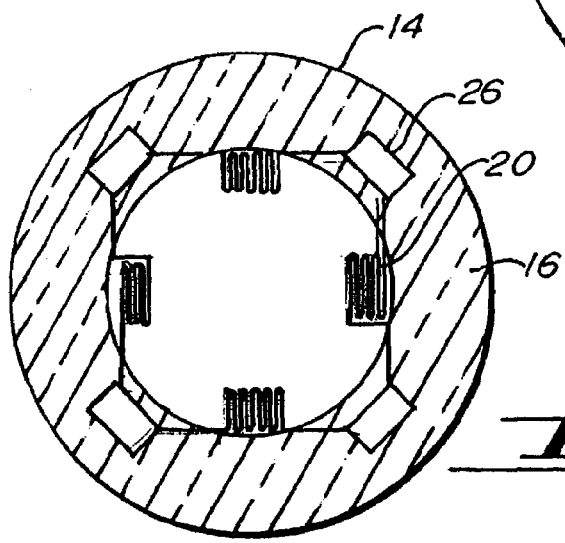
FIG. 7 is a partial sectional top plan view of an embodiment of the diaphragm of the present invention.

If ion implantation is chosen to dope the silicon, an annealing step is desirable following doping to remove stresses that build up in the film during the implantation process. The annealing step also helps distribute the dopant atoms more uniformly throughout the silicon layer. The silicon patterns 20 form a Wheatstone bridge 22 (see FIGS. 6 and 7). Those skilled in the art will appreciate that several different patterns can produce the Wheatstone bridge 22. The silicon resistors 20 may be patterned by standard photolithographic techniques. An insulating layer of silicon nitride 24 (see FIGS. 8 and 10) is applied to the entire surface of the sapphire wafer by chemical vapor deposition. Photolithographic resist is applied to the entire wafer. Windows are patterned in the resist and chemically removed. An acid itchant removes the underlying nitride exposed by the window in the resist. When the resist is etched away a window 28 is opened up above and adjacent to each of the connection points or bond pads 26 to the Wheatstone bridge (see FIG. 8). The silicon nitride layer 24 is a tough insulating layer and further protects the delicate silicon layer.

Metallic bond pads 26 are needed to connect the electrical leads 18 to the Wheatstone bridge 22. Metals commonly used as bond pads 26 in semiconductor devices such as gold and aluminum are unsuitable because they will alloy with the silicon at glassing temperatures. In the preferred embodiment a two metal layer bond pad is constructed (see FIG. 10). Using a process called radio frequency (RF) sputtering a layer of titanium 30 is deposited on the entire wafer. Titanium is a very active metal and has excellent bonding properties. Titanium, however, requires a diffusion barrier 32 between it and the braze material 34. The braze alloy 34 joins the bond pad 26 to pins 18. Without a diffusion barrier 32 the braze 34 will alloy with both the titanium layer 30 and the thin silicon layer 20. Upon cooling, this alloy would be drawn together by surface tension forces and locally destroy the silicon film. The diffusion barrier 32 needs to be a refractory metal that will not form alloys at the brazing temperatures (approximately 1000° C.). Without limitation, niobium, tungsten, iridium, molybdenum, tantalum, platinum, and palladium are suitable for this purpose. The barrier material 32 must be capable of being made into a film having a minimal amount of pinholes extending through the film. Any oxides must dissociate at brazing temperatures. Niobium is found to work well as a diffusion barrier. The niobium is RF sputtered across the entire sapphire wafer 14 on the top of the titanium layer 30. The niobium layer is then patterned using known lithographic techniques.

In the preferred embodiment, the metal for the bond pads 26 is deposited and patterned with methods know to those skilled in the art including, without limitation, evaporation and sputtering. The bond pad 26 is patterned in such a way that the metal overlies (see FIG. 8) a portion of the silicon layer 20 but is primarily in direct contact with the sapphire diaphragm 14. The reason for this is that metallization layers may have small pinholes. It has been found that if the braze 34 is able to penetrate the diffusion barrier 32 it will alloy with the silicon with consequent failure of the film. During glassing and brazing, the silica glass 16 can serve to inhibit the flow of the braze 34 from the pin to the region where the bond pad 26 metal overlies the silicon pattern 20. The braze 34 must not overly the silicon pattern 20.

Once the sapphire diaphragm 14 is patterned, the sapphire wafer is diced using known methods of dicing to separate the plurality of sapphire diaphragms from the sapphire wafer. Without limitation, several methods including scribe and fracture along crystal planes, ultrasonic machining, or laser cutting, may be utilized. The use of known methods allows for cutting round diaphragms 14 that are desirable for pressure sensor fabrication.

The electrical leads 18 are brazed to the bond pads 26 and the backing plate 12 is glassed to the diaphragm 14. The thick backing plate 12 or wafer is constructed of ceramic having holes or vias 36 (see FIG. 2). The vias 36 are formed in the backing plate 12 to align with the bond pads 26 and provide passage of electrical leads 18 from the sensor diaphragm 14 to the electronics utilizing the pressure information. A vent hole 38 is provided through the backing plate 12 when a gauge pressure sensing is desired. Generally, ceramics consist of metal oxide powders that are sintered together at high temperature typically using a small amount of glass to act as a binding agent. A common ceramic is alumina, which has many similar properties to single crystal sapphire. As long as the glass content of the alumina ceramic is kept below a few percent the thermal expansion properties of the two materials will be negligibly different.

A glass 16 that will bind well to both sapphire and alumina ceramic needs to have similar thermal expansion properties. Borosilicate glasses have been found to be well suited for this purpose. These glasses have far higher melt temperatures than those glasses used for frit bonding materials together. It has been found that sensors fabricated from bulk silicon and exposed to temperatures above 600° C. experience excessive diffusion of dopant atoms into adjacent regions. Thus, these bulk silicon sensors are typically restricted to processing temperatures of no more than 450° C. and then for only brief excursions. As indicated by Ghiselin et al. in U.S. Pat. No. 4,774,843, reliable bonding of a sapphire diaphragm to a ceramic backing plate has been a significant problem. The proposed high bond strength borosilicate glasses used in glassing are distinct from lower temperature low strength solder glass or glass frit. The solder glass has a melt temperature around 450° C. and is of lower strength.

Figure 4:
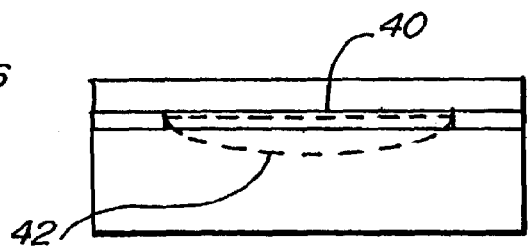
FIG. 4 is a partial sectional side elevational view of an embodiment of the pressure sensor of the present invention.

In order to bond the sapphire to alumina ceramic by "glassing" rather than brazing, a silica glass 16 may be pre-formed or screened onto the surface of the backing plate 12. In either case it is important that the silica glass does not flow far from where it starts. If the inner diameter of the glass pattern changes significantly the pressure characteristics of the sensor 10 can change drastically. Further, during the glassing process, if the glass 16 flows over the metallized bond pad 26 before the braze 34 on the bond pad 26 melts, the pins 18 will not braze to the bond pads 26. The firing of the glass should be at constant temperatures to avoid leaving stresses in the glass bond that could result in instability or glass fracture. Further the silica glass 16 must have openings or windows for the electrical pins 18. Additionally, by controlling the thickness of the silica glass bond 16 between the diaphragm 14 and the backing plate 12, the sensing diaphragm 14 will bottom out on the backing plate 12 during overpressure (see FIG. 4). Thus, this overpressure stop increases the overpressure capacity of the sensor 10 by a factor of 100 or more.

PN junctions are used to form any diode or transistor and are used to isolate any features that are on a silicon wafer. To simply make a Wheatstone bridge on a silicon substrate requires a PN junction to isolate the bridge from the substrate semiconductor. Although, PN junctions are extremely useful they deteriorate quickly above 400° C. For most processes it is not possible to leave a device at 450° C. for more than 30 minutes otherwise it will be destroyed. It is also obviously not possible to have a process that may last 2–6 hours at temperatures as high as 900–1100° C. in order to make high stability bonds. Because the Wheatstone bridge of the present invention is built directly on the sapphire diaphragm there is no PN junction therebetween that would cause a failure of the high melting temperature (above 400° C.). In addition, a PN junction may cause a breakdown of the glass bond of the diaphragm and back plate. Everywhere that a resistive surface is not needed the silicon is completely etched away.

The braze alloy 34 used to bond the electrical lead 18 to the bond pad 26 must melt at a temperature slightly below that of the silica glass 16. Further, the braze 34 must be aggressive enough at its melt temperature to remove any oxides from the metal layers 26. Without limitation, it has been found that several copper braze alloys of suitable known construction are capable of meeting these requirements. When the braze 34 melts before the glass 16 begins to flow, then if the silica glass 16 flows over the bond pad 26 it will flow over the braze 34 and bond pad 26, thereby providing significant stress relief to the bond pad region. Without limitation, a braze alloy such as Pakusil-15 (comprised of palladium, copper, and silver) sold by Wesgo Metals, San Carlos, Calif., a Division of Morgan Advanced Ceramics Incorporated has been found to braze acceptably.

The electrical lead or pin 18 should be of a small cross section and preferably be made of a ductile metal. Such a pin 18 structures that confined by the geometry of the holes 36 in the ceramic backing plate 12 will have good strain relief properties and will not conduct stress from the pins 18 to the sensing elements. Pins 18 should be plated with a material with good braze and reasonable soldering capabilities such as nickel or gold.

Figure 19A:
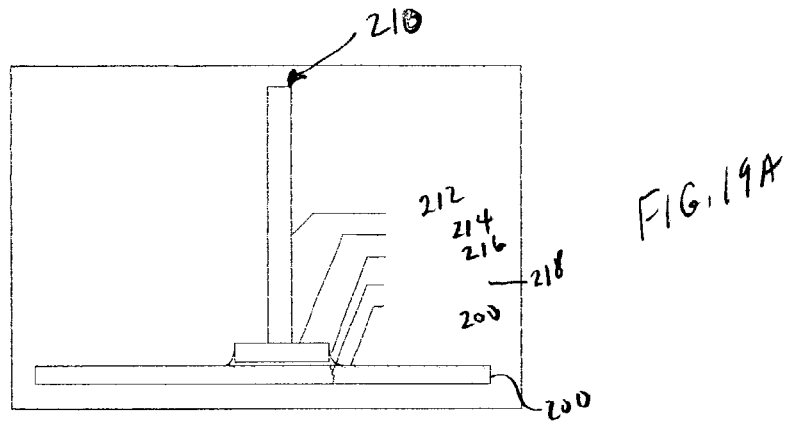
FIG. 19A is an example of a prior art brazing of a nail head pin to a substrate.
Figure 19B:
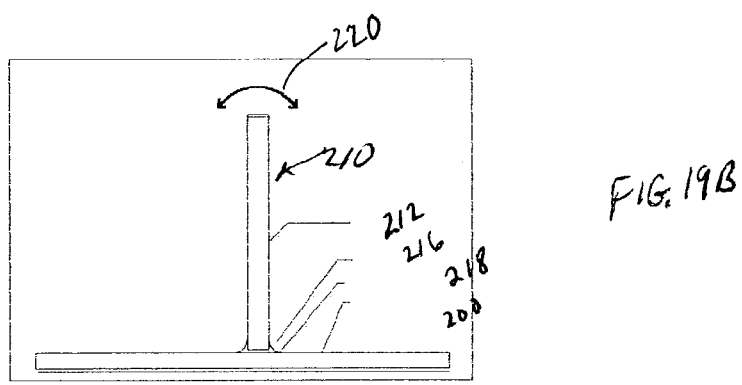
FIG. 19B is an example of a prior art brazing of a headless pin to a substrate.
Figure 20:
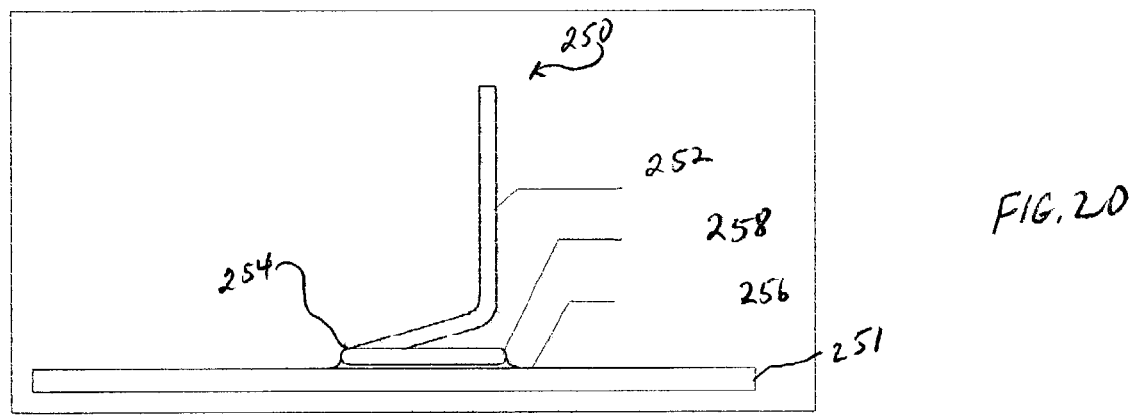
FIG. 20 is a partial side view of a coil pin embodiment of the present invention that is brazed to a substrate according to the teachings of the present invention.

An improved approach to brazing the pin or lead to the semiconductor substrate is to change the geometry of the joint, change the shape of the pin structure and strengthen the metal pin. FIG. 20 illustrates a partial side view of a coil pin embodiment of the present invention that is brazed to a silicon substrate according to the teachings of the present invention. Coil pin 250 is brazed to substrate 251 at coil pin head 254. In this particular embodiment, at the foot of pin 250 is a single circular coil 254 that is formed to function as the head of the pin. In a related embodiment, a spring is formed at the end of the shaft with the spring portion being mounted on the substrate. In another related embodiment, a multi-coil spring is used as the lead because of the case in fabrication and in maintaining 90 degrees alignment with the substrate. During the cooling phase of the brazing process, coil pin 259 is more flexible than a solid head pin illustrated in FIG. 19A. By matching the expansion coefficients as closely as possible using a material such as Kovar or Invar it is possible to reduce the stresses by a factor of 10 or more.

In one example embodiment, the pin has a length of about 0.320 inches, an outside diameter of coil 0.040 inches, and a wire diameter of about 0.008 inches. One important consideration in connection with the structure of the pin is the wire diameter. A preferred range of wire diameter dimensions is about 0.001 inches to about 0.020 inches. Another important design consideration to the structure of the wire is that the stiffness of wire increases with the $4^{th}$ power of the diameter. Nickel is preferred material for the lead, but Kovar works as well.

Another important design consideration is the thickness and composition of the braze material used in brazing the pin to the substrate. A preferred braze composition is comprised of 65% silver, 20% copper, and 15% palladium. Various copper-silver combinations are used to obtain melt temperatures near those of borosilicate glasses (~900° C.), however the amount of palladium used does affect the melt temperature of the braze. The more palladium is used in the composition, the higher the melt temperature for the braze material. Palladium also plays an important role in the braze composition in controlling the viscosity of the braze melt puddle. The viscosity of both silver and copper at melt temperature is known to be very low. Both these materials will readily migrate to adjacent regions both horizontally and vertically through thin film dielectrics. This behavior can result in electrical shorts and a low process yield. The palladium significantly increases the viscosity of the braze reducing the migration behavior of the silver and copper. In this example embodiment, the braze material has a thickness of about 0.0001 to about 0.0002 inches.

There are a number of braze processes that would be utilized in connection with the present invention. It is preferable to use a belt furnace process that allows the glass and brazing to take place in a single process. This approach is a cost savings but is not essential to the function of the braze joint.

In an alternate embodiment, nickel is used as the pin or lead material such that nickel does not closely match the expansion coefficient but has very low yield strength. While the expansion rate may be high the strength of the substrate crystalline structure and the braze material can overwhelm the strength of a small cross-section coil of wire. To compensate the coil portion is joined not only at the braze end but also at the other end where it is attached to the circuit board, wire or flex circuit. For this reason a material that solders easily is desirable. Gold, platinum, and nickel all meet this requirement with nickel having the lowest cost.

The high temperature capabilities of all of the materials of construction of the sensor 10 allows use of such sensor 10 at very high temperatures (above 400° C.) over extended periods of time and/or such sensor 10 may be molded directly into high performance plastic housings such as PFA (generic name) TEFLON® ("Teflon" is a registered trademark of E. I. DuPont DeNemours and Company) (see FIG. 14). Such molded in pressure sensor provides an extremely reliable seal between the sensor 10 and plastic housing.

Figure 3:
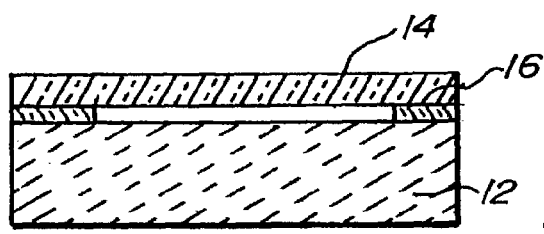
FIG. 3 is a partial sectional side elevational view of an embodiment of the pressure sensor of the present invention.
Figure 5:
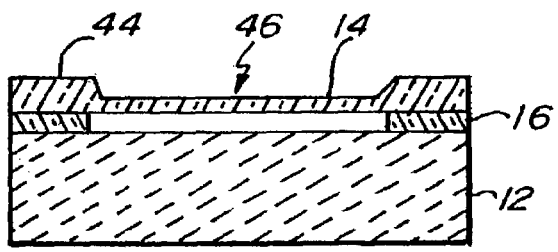
FIG. 5 is a partial sectional side elevational view of an embodiment of the pressure sensor of the present invention.

With reference again to the FIGS. 3 and 4, flexure of the diaphragm 14 will now be discussed. First dotted line identified by 40 represents a greatly exaggerated flexure of the diaphragm 14. Second dotted line identified by 42 represents a flexure of the diaphragm due to overpressure (disregarding the stopping affect the backing plate 12 has on flexure of the diaphragm during overpressure). Such drastic flexure would likely fracture or break the diaphragm 14. FIG. 5 shows a modified diaphragm 14, having thinner central portions of the diaphragm than the outer portion of the diaphragm. Typically, as the diameter of the diaphragm is decreased, the thickness of the diaphragm should decrease for maximum sensitivity. The gap between the diaphragm 14 and backing plate 12 may be controlled by the thickness of the glass bond 16. In one example embodiment, the glass thickness is minimized to improve the stiffness of the structure. A shallow depression (2 to 5 mils) is created in ceramic 12 at the time of molding. Under overpressure conditions the sapphire bottoms out on the interior surface of ceramic 12 and the flexural stress on sapphire diaphragm 14 is thereby limited.

Without limitation, a typical flexure of the diaphragm is between 0.01 to 0.0001 inches and the spacing may be between 0.02 to 0.0002 inches depending upon the thickness and diameter of the diaphragm 14. The order of magnitude of the gap is preferably twice the thickness of the diaphragm 14. The active sensing region of the diaphragm may range between 0.075 to 2 inches for a diaphragm having a thickness ranging from 0.002 to 0.050 inches. Practical constraints limit the thickness of a single crystal sapphire wafer during wafer fabrication. Unlike single crystal silicon, however, there is no easy method of forming thin sapphire diaphragms by chemical processes. Although manufacture of the diaphragm from a thinner sapphire wafer works up to a point, the high thermal stresses induced during the sensor forming process result in self-destructing internal stresses. Alternatively, increasing the diameter of the sensing area of the diaphragm increases sensitivity of a pressure device. However, as the diameter of the diaphragm increases so do the costs.

Figure 17:
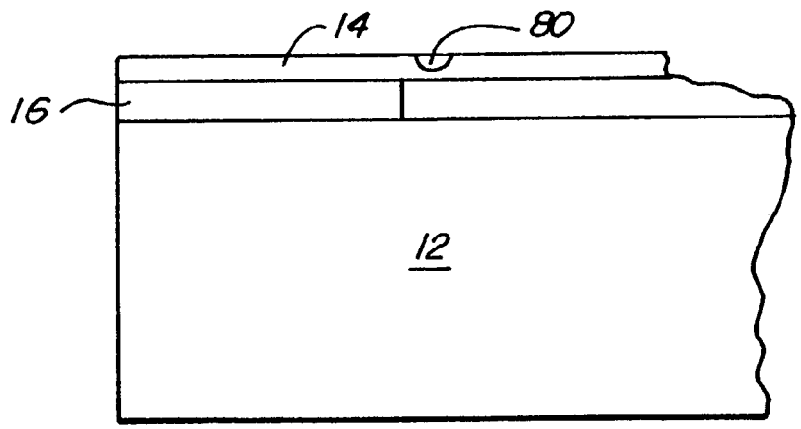
FIG. 17 is a partial sectional side elevational view of an embodiment of the pressure sensor of the present invention.

The modified diaphragm 14 shown in FIG. 5 reduces the thickness of the diaphragm proximate the sensing area while being manufactured from a thicker sapphire wafer. Thinning the diaphragm after thin film processing has been completed allows for more compliant pressure sensing diaphragms. A rim of material left around each device provides strength required, for example, when the sensing diaphragm is in direct contact with a pressure sensor housing. The thin central area 46 provides the sensitivity required. The sapphire diaphragm 14 can be thinned by conventional mechanical means such as abrasive machining or ultrasonic machining known to those skilled in the art. Alternatively, an annular groove 80 may be formed on the outer sensing surface of the diaphragm 14 (see FIG. 17). Those skilled in the art will appreciate that although the shape of the groove is not critical, rounded edges and groove is preferred. Also, although the groove is annular, other geometric shapes may be adequate to relieve flexure stress in the region adjacent the glass bond 16.

Referring now to FIG. 11 an alternate embodiment of the pressure sensor of the present invention is shown having a conductive layer sandwiched between the backing plate 12 and the silicon nitride layer 24. The conductive layer 48 is shown electrically grounded. In this manner electromagnetic and radio frequency interference (EMI and RFI) are blocked. EMI and RFI are known to degrade the performance of piezoresistive sensors. Because of the epitaxial construction of silicon on sapphire and the desire to bond the silicon directly to the sapphire, it is not possible to put a conductive layer between the silicon and the sapphire. Further, putting a conductive layer on the outside of the sapphire diaphragm would defeat the non-porous, chemically inert attributes of the sapphire diaphragm. Without limitation, the conductive or metallization layer 48 may comprise a layer of niobium, tungsten, iridium, molybdenum, tantalum, platinum, and palladium, or other material known to shield EMI and RFI. Thus, the metal layer 48 shields the sensing element from EMI and RFI originating from above the conductive layer.

Since the conductive layer 48 is at ground potential, the EMI and RFI will set up standing waves with zero potential at the conductive layer 48. It is known that if the radiation of the standing waves has frequency components whose wavelength is on the order of the distance between the ground plane and the resistive components, significant interference will result. If, on the other hand, the distance from the ground plane to the resistive component is small, then the standing waves will have negligible amplitude at the location of the piezoresistive element and no interference will occur. Since EMI and RFI interference occurs in the range of 1 MHz to 1,000 MHz, the minimum wavelength for this frequency range is 0.3 meters. Further, the distance between the ground plane and the piezoresistive elements or the silicon pattern 20 is equivalent to the thickness of the silicon nitride layer, which is one the order of 500 Angstrom's or 0.00000005 meters. Thus, the expected effectiveness of EMI and RFI shielding is approximately 6,000,000:1.

Referring now to FIG. 12 another alternate embodiment of the sensor 10 of the present invention is shown. A non-porous chemically inert pressure sensor may be used advantageously to detect pressures in a highly caustic environment. Sensors having a sensing diaphragm constructed with single crystal sapphire provide excellent protection against chemical attack. The sensor 10 may be positioned within a pressure transducer housing 50 (see FIG. 13) having primary and secondary seals 52 and 54. If the primary seal engages the outer surface of the sapphire diaphragm, the process fluid wets only the seal and the sapphire. Since seals of known suitable construction are permeable to process fluids, some process fluid will get beyond the primary seal. Very aggressive process fluids such as hydrofluoric acid permeate past the first primary seal may attack the joint between the sapphire diaphragm 14 and the ceramic backing plate 12. The contaminants from the corrosion of the joint may then permeate back into the process fluids. The present invention may include a chemically resistant polymer such a an acid resistant epoxy, for example without limitation, acid resistant epoxy EP21AR available from Master Bond, Inc. of Hackensack, N.J. applied to the edge of the sensor 10 surrounding the joint. Alternatively, a gasket type seal made of, for example without limitation, TEFLON, or an elastomeric type seal 84 made of, for example without limitation, KALREZ, may be compressed against the joint of the sensor as shown in FIG. 18. The seal 84 has an L-shaped cross-section and may wrap around the side of the sensor 10 and onto the diaphragm 14 sensing outer surface. Those skilled in the art will appreciate that the gasket seal 84 may be formed as part of the housing 50. Further, to enhance electrical shielding, the material could be made electrically conductive by blending in carbon powder. The conductive epoxy could be connected to an electrical ground by means of conductive ink 58 which is coupled to the ground.

In another example embodiment, the sensor is coated (including the sapphire surface) with Paralyne so as to limit chemical extraction from the sapphire and into the process fluids when the sensor is in use. In yet another embodiment, the sensor can also be coated with PFA to also limit chemical extraction from the sapphire diaphragm.

Figure 13:
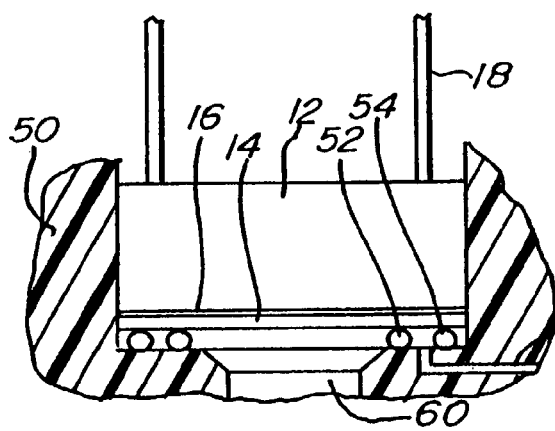
FIG. 13 is a partial sectional side elevational view of an embodiment of the pressure sensor of the present invention shown positioned in a pressure transducer housing.
Figure 14:
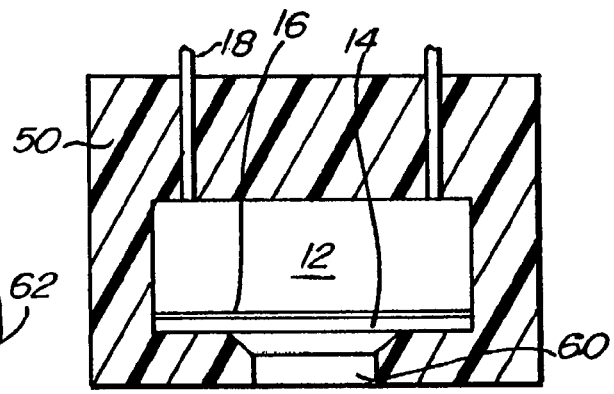
FIG. 14 is a partial sectional side elevational view of an embodiment of the pressure sensor of the present invention shown molded into a pressure transducer housing.

Referring to FIG. 13 the sensor 10 is shown positioned within a pressure transducer housing 50 having fluid port 60. The sapphire diaphragm seals against the primary and secondary seals 52 and 54. A vent or drain 62 may extend from the outside of the pressure transducer housing into the housing between the primary and secondary seal. The vent 62 may relieve pressure between the seals and/or provide a passage for fluids permeating through the primary seal to exit out the pressure transducer housing 50. The sensor 10 of the present invention having a sapphire diaphragm 14 provides a pressure sensor that is corrosion and solvent resistant, has desired flexure with no measurable temperature or pressure hysteresis, and can tolerate process fluid temperatures exceeding 400° C. Referring to FIG. 14, since the pressure sensor is able to withstand high temperatures, the pressure sensor may alternatively be molded into the plastic housing 50 of the pressure transducer as an insert during the plastic injection molding process, thereby eliminating the need for a primary or secondary seal. The housing itself acts as a seal to the sensor 10. Such mold in place pressure sensor and module is expected to reduce production costs, simplify construction and decrease the overall size of the pressure transducer module.

Figure 15:
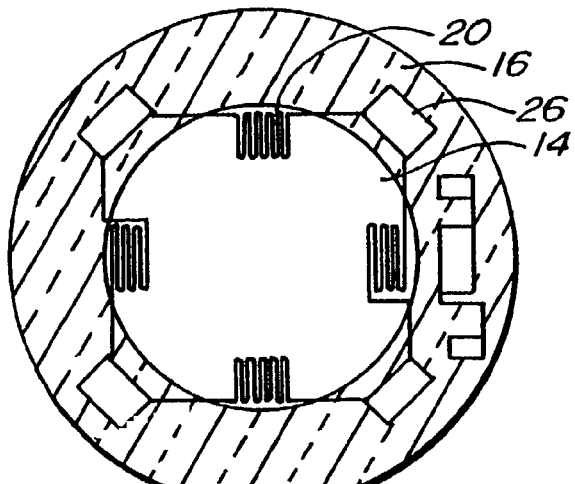
FIG. 15 is a partial sectional top plan view of an embodiment of the diaphragm of the present invention.

Referring to FIG. 15, another alternate embodiment of the sensor 10 of the present invention is shown. The sensor 10 is capable of detecting both the pressure and temperature of the fluid adjacent the diaphragm 14. Bond pads 72 are formed on the sensor in a similar manner and at the same time as bond pads 26. The resistor 70 is formed between the glass bond 16 and the diaphragm 14. By positioning the resistor outside the pressure stress zone, pressure induced stresses that may affect the resistance of resistor 70 are thereby avoided. The resistance of the single crystal silicon resistor 70 has well-defined temperature dependence. It has been found that for high doping concentrations (p doping above $10^{19}$ atoms/cc) the function between temperature and resistance closely approximates a linear function. Thus, as resistance changes the temperature change is readily determinable.

Figure 16:
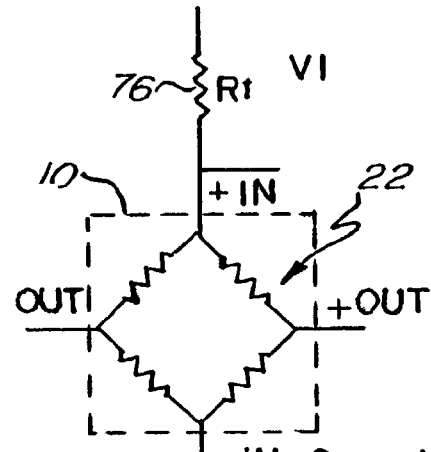
FIG. 16 is an electrical schematic of an embodiment of the diaphragm of the present invention.

FIG. 16 shows another embodiment of the sensor 10, wherein the resistors of the Wheatstone bridge 22 are utilized to both determine pressure and temperature. The outer periphery of sensor 10 is represented by a dotted line. Again, the resistance of the single crystal silicon resistors that comprise the Wheatstone bridge have well-defined temperature dependence. A resistor 76 designated as "Rt" in FIG. 16 is electrically coupled to the Wheatstone bridge 22 but is of zero temperature coefficient construction. A metal film resistor meets this requirement. For example, without limitation, the resistor 76 may be located with the sensing electronics of a pressure transducer and remote from the diaphragm 14. The value of the resistor 76 is preferably approximately half of the value of the Wheatstone bridge 22 resistance. The effects of pressure on the accuracy of the temperature determination is negligible when the temperature is determined using a polynomial along with data fitting procedures known to those skilled in the art. As the Wheatstone bridge 22 resistance changes with temperature the voltage Vt will also vary. The whole bridge may be utilized as one resistor in a voltage dividing circuit. The voltage Vt can then be used as a temperature signal for an analog or digital correction scheme.

The voltage Vt will depend almost entirely upon the temperature of the Wheatstone bridge 22, especially if the silicon resistors are heavily doped. If the silicon resistors are lightly doped or if the user desires to reduce the uncertainty in the measurement of temperature, the temperature can be derived by a matrix characterization. The following polynomial may be utilized, wherein temperature T is expressed both as a function of outputs Vt and Vp:

$$T = a_{00} + a_{01}V_T + a_{02}V_T^2 + \ldots + a_{10}V_P + a_{11}V_PV_T + a_{12}V_PV_T^2 + \ldots + a_{20}V_P^2 + \ldots$$

Wherein the coefficients $a_{xx}$ are obtained by a least squares fitting procedure known to those skilled in the art. Utilization of the above characterization along with the data fitting procedure will provide a sensor with a calibrated temperature output that is calibrated for strain effects. Thus, the simultaneous measurement of pressure and temperature from a single sensor is achieved with quick response times. Alternatively, if only temperature output is desired, pressure characterization can be avoided by orienting the legs of the resistor in the axis that is not strain sensitive. For example, maximum strain sensitivity of R-plane silicon on sapphire is attained by orienting the resistor elements 45 degrees to the projected C-axis, where the R-plane and C-axis are defined by Miller indices of crystal geometry. Piezoresistance is zero for resistor elements aligned parallel or perpendicular to the projected C-axis. The axis of the resistors can be rotated to eliminate pressure sensitivity. In this manner, sensor 10 could be made to eliminate pressure sensitivity and to, thus, only determine temperature proximate the sensor 10.

High temperature glass seals (above 700° C.) are much stiffer and have less hysteresis than low temperature bonding methods (typical 450° C. glass). The high temperature sealing process, however, will destroy any structure (bond pad) needed for traditional wire bonding. The conventional alternative to wire bonding is conductive epoxy, however conductive epoxy has a tendency to oxidize and increase in resistance over time. This increase in resistance results in an output shift of the sensor. The brazing process and the electrical lead configuration of the present invention provides an effective solution to this problem.

Silver and copper are ineffective when used as brazing materials because they tend to diffuse quickly into the silicon or silicon substrate and damage electrical/electronic structures that are displaced far away from the location that they were melted. In the present invention, palladium is used to increase the viscosity of the fluid braze puddle during heating and acts to control the migration of silver and copper.

Figure 21:
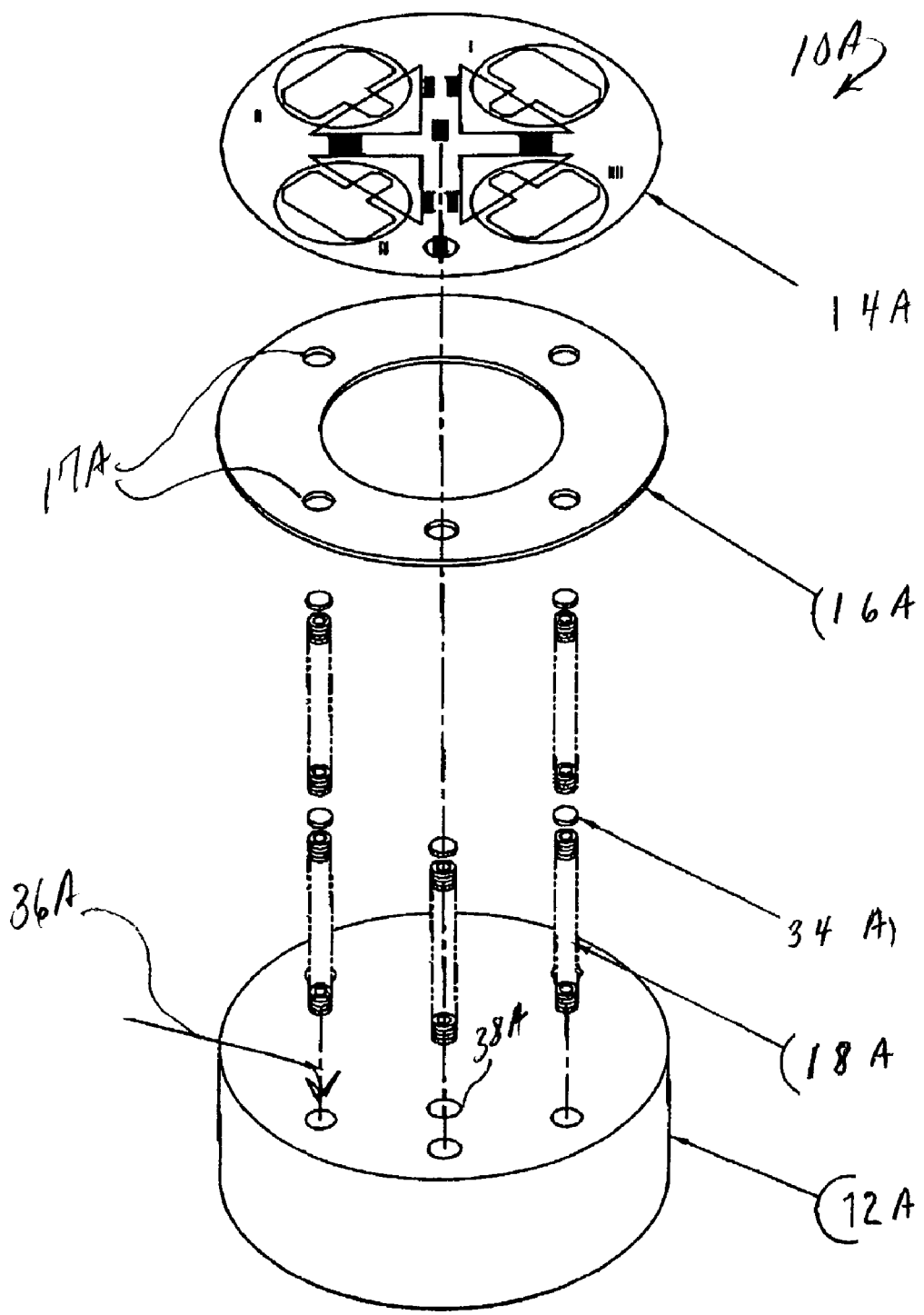
FIG. 21 is an exploded view of a sensor with coil spring leads that are brazed to the diaphragm according to the teachings of the present invention.

FIGS. 21 and 22 illustrate a related sensor embodiment, sensor 10A (either pressure, temperature or both) of the present invention that is configurable as a piezoresistive or capacitive sensor having a sensing diaphragm 14A. Sensing diaphragm 14 is made of a piece of single crystal sapphire. Alternatively, the sensing diaphragm may be constructed of a single crystal diamond. Sensor 10A of the present invention generally comprises a backing plate 12A, sensing diaphragm 14A, a silica glass perform plate 16A (preferably borosilicate glass—of high temperature (over 700° C. and having high strength) used to form the glass bond between the backing plate 12 and the diaphragm 14, and coil spring electrical leads 18A. In this example, backing plate has apertures 36A that extend therethrough, and accommodate the leads, and includes at least one offset vent hole 38A.

In this example embodiment, the sapphire diaphragm has a diameter of about 0.695 inches and is preferably slightly smaller in diameter than silica plate 16. Preformed silica plate 16 has an outside diameter of about 0.710 inches, an inside diameter of about 0.380 inches and is about 0.010 inches in thickness. Apertures 17A, which accommodate the leads, have a diameter of about 0.050 inches and are disposed on an imaginary inner ring having a diameter of about 0.545 (see FIG. 22). Preformed braze alloy 34A is preferably a composite material made of palladium, copper and silver (65% Ag., 20% Cu.; and 15% Pd.) and has a diameter of about 0.047+/−0.002 inches and a thickness of about 0.002+/−0.001 inches. Once the braze material has melted onto the lead, the pull strength should be a minimum of 2 pounds.

Backing plate 14A is 96% alumina and has a diameter of about 0.710+/−0.005 inches and has a thickness of about 0.240+/−0.005 inches. Apertures 36A have a diameter of about 0.050 inches while vent hole 38A has a diameter that tapers (in this embodiment) from a diameter of 0.050 to 0.032 inches. The tapered end is disposed adjacent the diaphragm.

A side view of sensor 10A, shown in FIG. 22, illustrates that about 20% of leads 18A protrude above backing plate 12A. As illustrated in FIG. 23, the coil spring lead 18A has a length preferably of 0.32 inches and is preferably comprised of, but is not necessarily limited to, two dead coil portions 19A and an expanded middle coil portion 19B. In FIG. 22, a dead coil portion 19A protrudes about 20% of its length from backing plate 12A. The coils preferably have a diameter of about 0.036 inches to about 0.042 inches. Nickel is preferably used to form the coil spring leads because of its pliability. Kovar can also be used to form the coil spring leads, but it is a more difficult material to work with because of its stiffness.

In a related embodiment, the coil spring lead configuration described above and illustrated in FIG. 23 can also be used in other electronic applications where flexibility in the lead is preferred and there is a concern for fracturing the underlying substrate.

During the manufacture of the sensor a weight is place on the assembly of components of sensor 10A to ensure that a good glass bond is formed between the backing plate and the diaphragm. In this example embodiment, the weight used is made of stainless steel and weighs about 100 grams per square inch of sealing surface. The stainless steel is preferred because it does not react to the other materials in the process but the weight can be made of other non-reacting materials. The weight is preferably placed on the side of the backing plate that has leads 18A protruding therefrom. In this example embodiment, the glass bond is formed and the leads are brazed in a single heating/melting operation, such as subjecting the entire assembly to a belt furnace. In a related embodiment, the backing plate and diaphragm are glass-bonded together first. The braze material is then placed into the apertures along with the leads and the assembly is subjected to a brazing temperature of about 925° C. and then slowly cooled (about 7–10° C. per minute) to avoid substrate fracturing, the entire operation lasting about 2 hours. The processing time will vary depending on the thermal mass of the sensor being manufactured (e.g., the bigger the sensor the longer the cooling time).

Another step in the processing of the sensor is to preferably form the glass bond and the brazing in a non-oxidizing environment. Oxygen that is present during the brazing process will cause oxidation of the semiconductor surfaces thereby interfering with the mechanical and conductive joints to be formed between the brazed lead and the sensing element on the diaphragm. One approach is to use argon or nitrogen gas to substitute for oxygen in the chamber where the sensor is formed. Another approach is to use vacuum brazing at a high temperature (above 1050° C.) to avoid oxidation of the device surfaces.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A sensor having a non-porous outer surface, said sensor comprising:
    a backing plate that includes apertures extending therethrough;
    a diaphragm;
    a sensing element disposed over an inner surface of the diaphragm;
    at least one electrical lead extending through at least one aperture and coupled to the sensing element on the diaphragm, the electrical lead having a coil head adapted for brazing over the inner surface of the diaphragm with a high temperature braze composition; and
    a glass layer adapted to be bonded by glassing to the backing plate and the diaphragm, the glass layer having both a high bond strength and a high melt temperature that is at or above 700° C., wherein the glass layer bonds the backing plate to the diaphragm and the coil head is brazed to the sensing element.

2. The sensor of claim 1, wherein the at least one electrical lead has a coefficient of expansion similar to that of the diaphragm to reduce stresses on the diaphragm as the braze composition and the lead are cooled after being subjected to a single high temperature melting operation.

3. The sensor of claim 1, wherein the at least one electrical lead is formed into a coil spring from a wire selected from the group consisting of nickel and KOVAR.

4. The sensor of claim 1, wherein the braze composition comprises copper, silver and palladium.

5. The sensor of claim 1, further comprising:
    bond pads disposed between said glass layer and said non-porous diaphragm; and
    windows formed in said glass layer providing access to said bond pads, wherein said electrical leads are brazed to said bond pads.

6. The sensor of claim 5, wherein said bond pads comprise a titanium layer and a diffusion barrier and the diaphragm is comprised of sapphire.

7. An electrical lead member configured for use in connection with a semiconductor element disposed on an insulating substrate, the electrical lead comprising a coiled lead member, a portion of the coiled member adapted to be brazed to the semiconductor element on the substrate.

8. The lead member of claim 7, wherein the coiled member is located at the end of a shaft of an electrical lead member and is comprised of a coiled spring member adapted to be bonded to the semiconductor element.

9. The lead member of claim 7, wherein the coiled member is a coiled spring member.

10. The lead member of claim 9, wherein the coiled spring member is comprised of a plurality of coils, the coils at an end being more closely spaced than the coils in the middle.

11. A method of bonding an electrical lead to a semiconductor device comprising the steps of:
   forming an electrical lead comprised of a coiled member;
   applying a braze composite material on the substrate surface;
   locating a portion of the coiled member on the braze material and on a substrate surface such that a shaft of the lead is substantially perpendicular to the surface of the substrate; and
   heating the braze composite material to a sufficiently high temperature such that the braze material melts and the coiled member adheres to the substrate surface as the braze material cools.

12. The method of claim 11, wherein forming the coiled member includes a coil head formed from a plurality of coils.

13. The method of claim 11, further comprising cooling the braze material over time to avoid a stress fracture in the substrate.

14. The method of claim 11, wherein forming the coiled member includes forming a coil head on the electrical lead.

15. The method of claim 11, further comprising the step of adding a weight on the sensor before heating the braze material.

16. A method for bonding an electrical lead to a semiconductor device comprising the steps of:
   forming an electrical lead comprised of a coiled member;
   providing a backing plate that includes apertures extending therethrough;
   providing a substrate having a semiconductor element thereon and adapted to be coupled with the backing plate;
   providing a glass layer adapted to be bonded by glassing to the backing plate and the substrate, the glass layer comprised of a high bond strength and high melt temperature material;
   applying a braze composite material in the apertures of the backing plate; and
   locating the coiled member of the electrical lead through at least one aperture in the backing plate and adjacent the braze material, such that a portion of the lead is protruding from the backing plate; and
   heating the braze composite material and the glass layer to a sufficiently high temperature such that the coiled member is brazed to the substrate and the backing plate and the substrate are glassed together.

17. The method of claim 16, wherein the electrical lead is comprised of the coiled member and a shaft.

18. The method of claim 16, further comprising the step of adding a weight on the sensor before heating the braze material.

* * * * *